United States Patent
Guthals et al.

(10) Patent No.: US 8,736,932 B1
(45) Date of Patent: *May 27, 2014

(54) INCOHERENT BEAM COMBINING OF PARALLEL BEAMS WITH OPTICAL PATH COMPENSATION USING REAL TIME HOLOGRAPHY

(75) Inventors: Dennis M. Guthals, Thousand Oaks, CA (US); Daniel J. Sox, Redondo Beach, CA (US); Margarita A. Carbon, Calabasas, CA (US); Blair F. Campbell, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,016

(22) Filed: Jun. 14, 2012

Related U.S. Application Data

(62) Division of application No. 12/635,691, filed on Dec. 10, 2009, now Pat. No. 8,289,596.

(51) Int. Cl.
*G03H 1/08* (2006.01)
(52) U.S. Cl.
USPC ............................. 359/9; 359/15; 250/201.9
(58) Field of Classification Search
None
See application file for complete search history.

(56) References Cited

U.S. PATENT DOCUMENTS

| | | | | |
|---|---|---|---|---|
| 6,249,381 B1* | 6/2001 | Suganuma | | 359/618 |
| 7,710,639 B2* | 5/2010 | Cottingame et al. | | 359/349 |
| 7,796,326 B1* | 9/2010 | Shay et al. | | 359/349 |
| 8,228,599 B1* | 7/2012 | Carbon et al. | | 359/349 |
| 8,289,596 B1* | 10/2012 | Guthals et al. | | 359/9 |
| 8,320,031 B1* | 11/2012 | Sox et al. | | 359/9 |
| 8,339,694 B1* | 12/2012 | Sox et al. | | 359/9 |
| 2002/0126479 A1* | 9/2002 | Zhai et al. | | 362/244 |

OTHER PUBLICATIONS

M. T. Gruneisen, K. W. Peters, J. M. Wilkes, 'Compensated imaging by real-time holography with optically addressed liquid-crystal spatial light modulators', Proc. SPIE, vol. 3143, 1997, pp. 171-181.*

* cited by examiner

*Primary Examiner* — Arnel C Lavarias
(74) *Attorney, Agent, or Firm* — Felix L. Fischer

(57) ABSTRACT

A system for path compensation of multiple incoherent optical beams incorporates an optical element combining a plurality of incoherent beams to an aperture by angle using carrier frequency tilt fringes. An illumination laser is employed for reflection of an illumination beam from a target. An interferometer receives a sample of the reflected illumination beam reflected from the target and provides interference fringes. A spatial light modulator receives the interference fringes and generates a real time hologram. Relay optics are employed for transmitting the combined plurality of incoherent beams to the SLM and receiving a diffraction corrected full aperture compensated combined beam for emission to the far field.

14 Claims, 6 Drawing Sheets

INCOHERENT BEAM COMBINING OF PARALLEL BEAMS WITH OPTICAL PATH COMPENSATION USING REAL TIME HOLOGRAPHY

REFERENCE TO RELATED APPLICATIONS

This application is a divisional application of application Ser. No. 12/635,691 filed on Dec. 10, 2009 by inventors Dennis M. Guthals, Daniel J. Sox, Mararita A. Carbon and Blair F. Campbell having the same title as the present application and is copending with application Ser. No. 12/635,689 filed Dec. 10, 2009 by inventors Margarita A. Carbon and Dennis M. Guthals entitled Coherent Beam Combining Using Real Time Holography, application Ser. No. 12/635, 696 filed Dec. 10, 2009 by inventors Daniel J. Sox, Dennis M. Guthals, Margarita A. Carbon and Blair F. Campbell entitled Incoherent Spectral Beam Combining with Optical Path Compensation Using Real Time Holography, and application Ser. No. 12/635,698 filed Dec. 10, 2009 by inventors Daniel J. Sox, Dennis M. Guthals, Blair F. Campbell and Margarita A. Carbon entitled Real Time Holographic Fringe Blazing Using Fringe Minima Detection, each of which is incorporated herein by reference as though fully set forth.

BACKGROUND INFORMATION

1. Field

Embodiments of the disclosure relate generally to the field of optical systems for laser transmission and more particularly to embodiments to combine multiple sub-aperture incoherent laser sources using a self-referenced interferometer generated hologram of the optical path to the target on a Spatial Light Modulator to remove optical path aberrations and form a spatially overlapped far field spot that is range independent.

2. Background

Combining of multiple incoherent laser beams for delivery through a common aperture provides for increased power and other desired characteristics. Current approaches for combination of incoherent beams require separate beam control or adaptive optics for each laser beam. Existing solutions require visible overlap of the beams to start and knowledge of the target range to maintain overlap. Additionally very precise piston, tip and tilt tolerances are required in the beam control system and optical trains to maintain the beams within the alignment ranges of the control loops. Existing solutions combine the beams with active steering systems for each beam using a static grating requiring separate piston, tip, and tilt control on each sub-aperture and do not add the benefit of adaptive optics to also compensate for the path to the target. Optical systems which maintain the required high tolerances are complex and expensive. Additionally, conventional adaptive optical devices and controls are fragile and require constant tuning therefore becoming impractical for fieldable systems.

It is therefore desirable to provide a laser beam control system which reduces complexity, size, weight, and power, reduces the adaptive optics requirements and reduces cost while improving far field beam quality.

SUMMARY

Exemplary embodiments provide a system for path compensation of multiple incoherent optical beams incorporating an optical element combining a plurality of incoherent beams to an aperture. In one configuration, the incoherent beams are combined by angle using carrier frequency tilt fringes. An illumination laser is employed for reflection of an illumination beam from a target or as backscatter. An interferometer receives a sample of the reflected illumination beam and provides interference fringes. A spatial light modulator receives the interference fringes and generates a real time hologram. Relay optics are employed for transmitting the combined plurality of incoherent beams to the SLM and receiving a diffraction corrected full aperture compensated combined beam for emission to the far field.

In an exemplary configuration, the reflected illumination beam is transmitted through the relay optics to the interferometer. In a further configuration a beam splitter receives a portion of the reflected illumination beam prior to the relay optics to transmit that portion to the interferometer as a local reference. Also in one configuration, the interference fringes are blazed for transmission to the spatial light modulator.

The disclosed embodiments provide a method for combining optical beams wherein multiple incoherent beams are first combined by angle using carrier frequency tilt fringes. An illumination laser beam is reflected off a target or returned as backscatter. The returned illumination beam as perturbed by the path to the target is received and interference fringes are formed from the returned illumination beam in an interferometer. The fringes are then transferred to a spatial light modulator and a real time hologram is generated. The combined incoherent beams are then diffracted from the SLM hologram fringes and emitted to the far field with diffractive compensation for path perturbation of each sub-aperture.

In certain embodiments employing local referenced interferometer, a portion of the returned illumination beam is segregated as a local reference and provided to the interferometer. The interference fringes are then created combining the local reference. In certain embodiments, blazing of the fringes is employed.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein demonstrate a system for efficient and simple beam combination of multiple incoherent laser sources such as solid state, fiber, etc. for directed energy, Lasercom and other applications. Several sub-aperture incoherent laser sources are combined using a local-referenced interferometer generated hologram on a Spatial Light Modulator (SLM) to remove path perturbations such as atmospheric interference between the laser and the target and form a diffraction-limited full aperture far field intensity.

Figure 1:
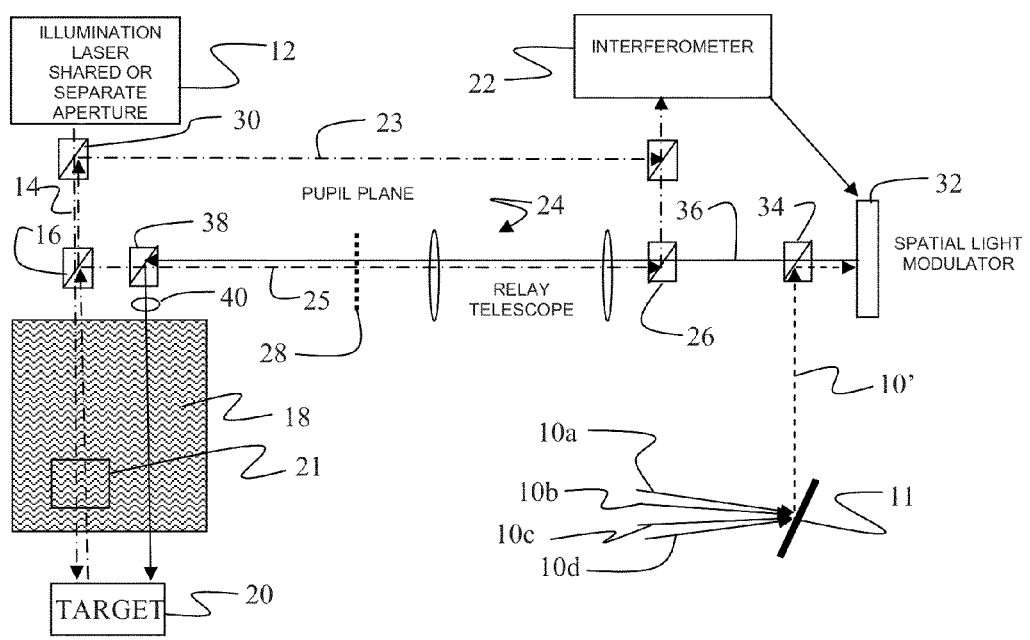
FIG. 1 is a block diagram of the elements of an embodiment.

Referring to FIG. 1 for an exemplary embodiment, multiple incoherent laser sources (four for the embodiment shown) provide beams 10a, 10b, 10c and 10d to the system. The beams are combined by angle using carrier frequency tilt fringes ($n\lambda = 2d \sin(\theta)$) in optical element 11 to create a combined beam 10'. An illumination laser 12 with a wavelength near the sub-aperture beam wavelengths provides a beam 14, which may be transmitted through a separate aperture 16 or a shared aperture with the ultimate beam output to be described subsequently, is perturbed by the atmosphere (represented by element 18) to and from the target 20. In alternative embodiments, the illumination laser may rely on backscatter (conceptually represented by block 21), similar to a guide star laser, for return of atmospheric perturbations. An interferometer 22 having a focal plane array (FPA) receives the returned illumination beam, represented by ray 23. For the embodiment shown in the drawing, the split illumination beam represented by ray 25 transitions through relay optics for the system such as relay telescope 24 and beam splitter 26 additionally reflecting any perturbations by the relay optics with respect to the pupil plane 28. The interferometer 22 is self referenced however a portion of the reflected illumination beam segregated by beam splitter 30 as shown in FIG. 1 may be supplied to the interferometer 22 as a local reference to correct for the relay optics sampled by the reflected illumination beam. The interferometer 22 creates fringes reflecting the perturbations acting on the illumination beam 14 and provides a blazed conjugate order grid to spatial light modulator (SLM) 32 for creation of a hologram.

The combined incoherent beams 10' are directed through beam splitter 34 to the SLM 32. SLM 32 creates a real time hologram of the blazed grating provided by interferometer 22 which diffracts the combined beams 10' into conjugate order. The corrected beam 36 is diffracted from the SLM through beam splitter 34 into the relay optics including relay telescope 24 which transmit the beam through beam splitter 38 to output lens 40 as the output aperture. The individual laser beams each see a sub-aperture of the optical distortion which contains all of the phase information of the full aperture derived from the illumination beam and are therefore fully compensated and spatially overlapped at the target 20 without requirement for complex adaptive optics for each incoherent beam. The combined incoherent beams focus to a common spot given by the diameter of a sub-aperture over all target ranges. In conventional systems with separate adaptive optics trains for incoherent beam, each sub-aperture would focus to a common spot at only one range.

Figure 2:
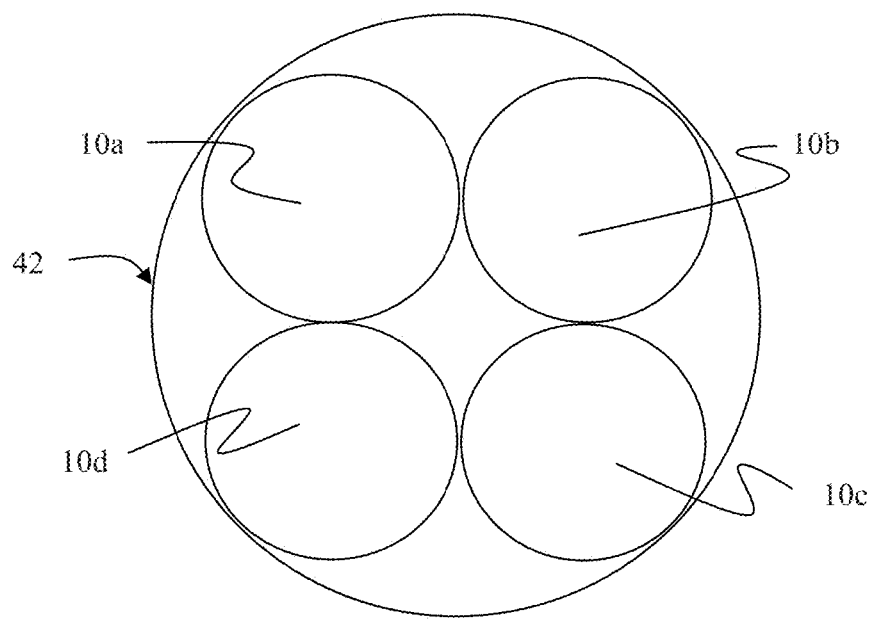
FIG. 2 is a depiction of the incoherent beams for combination.

FIG. 2 shows a representation of the four incoherent beams 10a, 10b, 10c and 10d as combined in the aperture 42. Only one adaptive optical (AO) device, SLM 32, is required once the beams are parallel to provide complete compensation for the entire path to the target.

Figure 3:
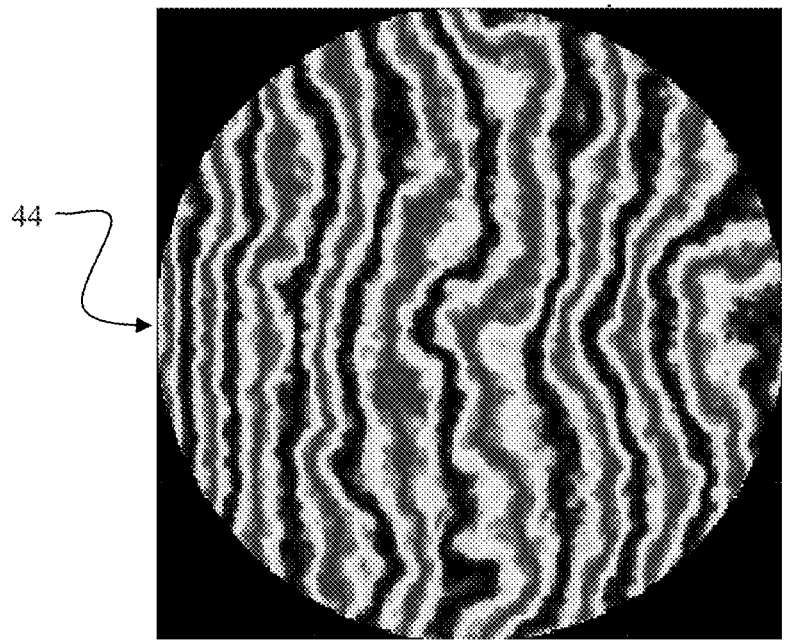
FIG. 3 is a depiction of the interference fringes of the interfered illumination laser and combined beam at the detector
Figure 4:
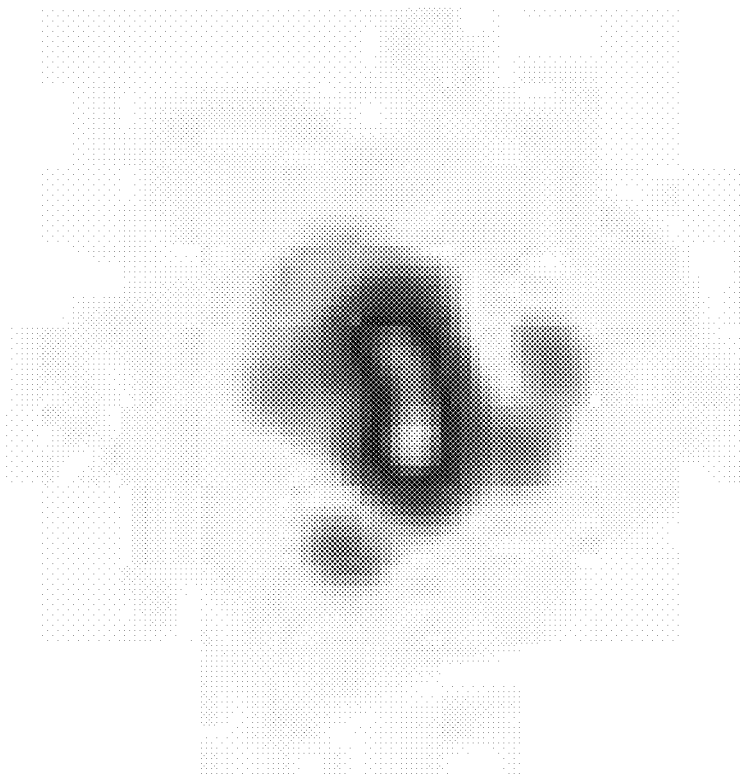
FIG. 4 is a depiction of the far field image for combined non-phased incoherent beams.
Figure 5:
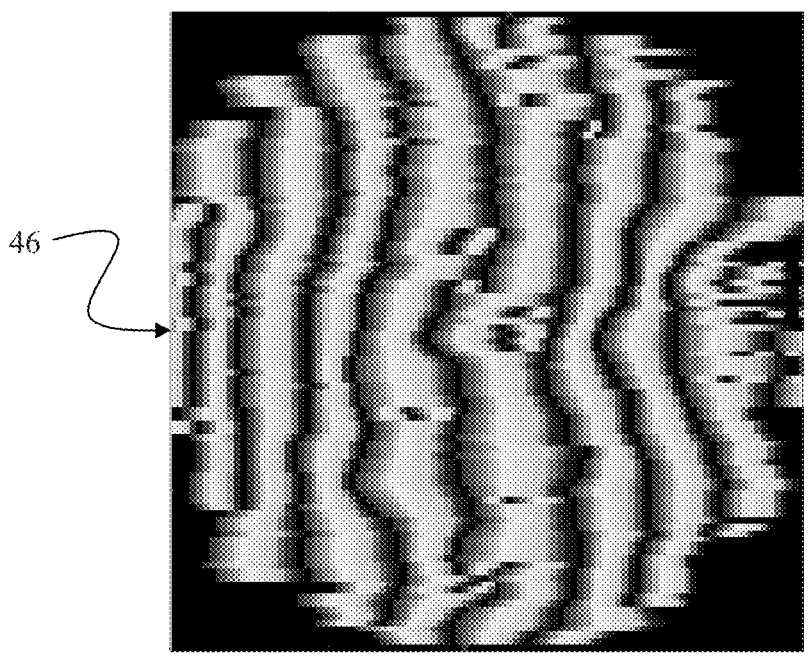
FIG. 5 is a depiction of the blazed holographic fringes provided by the Spatial Light Modulator.
Figure 6:
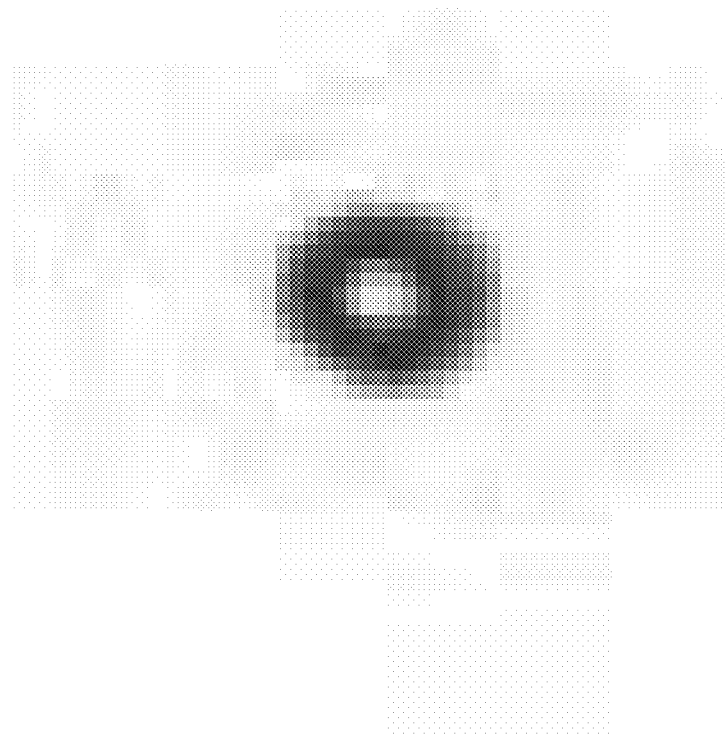
FIG. 6 is a depiction of the far field image for the phase corrected beams; and, FIG. 7 is a flow chart of the method employed by the embodiment to compensate multiple subaperture incoherent laser sources for path perturbations.

FIG. 3 shows an exemplary fringe pattern 44 at the pupil plane created by the interferometer for the aperture based on the received illumination laser beam. Without correction, the four incoherent beams would create an uncompensated beam far field at target 20 as represented in FIG. 4; for the example shown, a resulting Strehl of less than 0.1 (where the Strehl measurement is the ratio of the observed peak intensity at the detection plane of a telescope or other imaging system from a point source compared to the theoretical maximum peak intensity of a perfect imaging system working at the diffraction limit). With compensation provided by diffraction from the real time holographic blazed fringe grating 46 of the SLM shown in FIG. 5 a representation of the four compensated and combined incoherent beams at target 20 are shown in FIG. 6 with a resulting Strehl of approximately 0.5. For the embodiment shown, the SLM employed is high power dual frequency Liquid Crystal Spatial Light Modulator (LCSLM) providing 100×100 pixel resolution at 100 kW allowing eight pixels per fringe for best performance.

Figure 7:
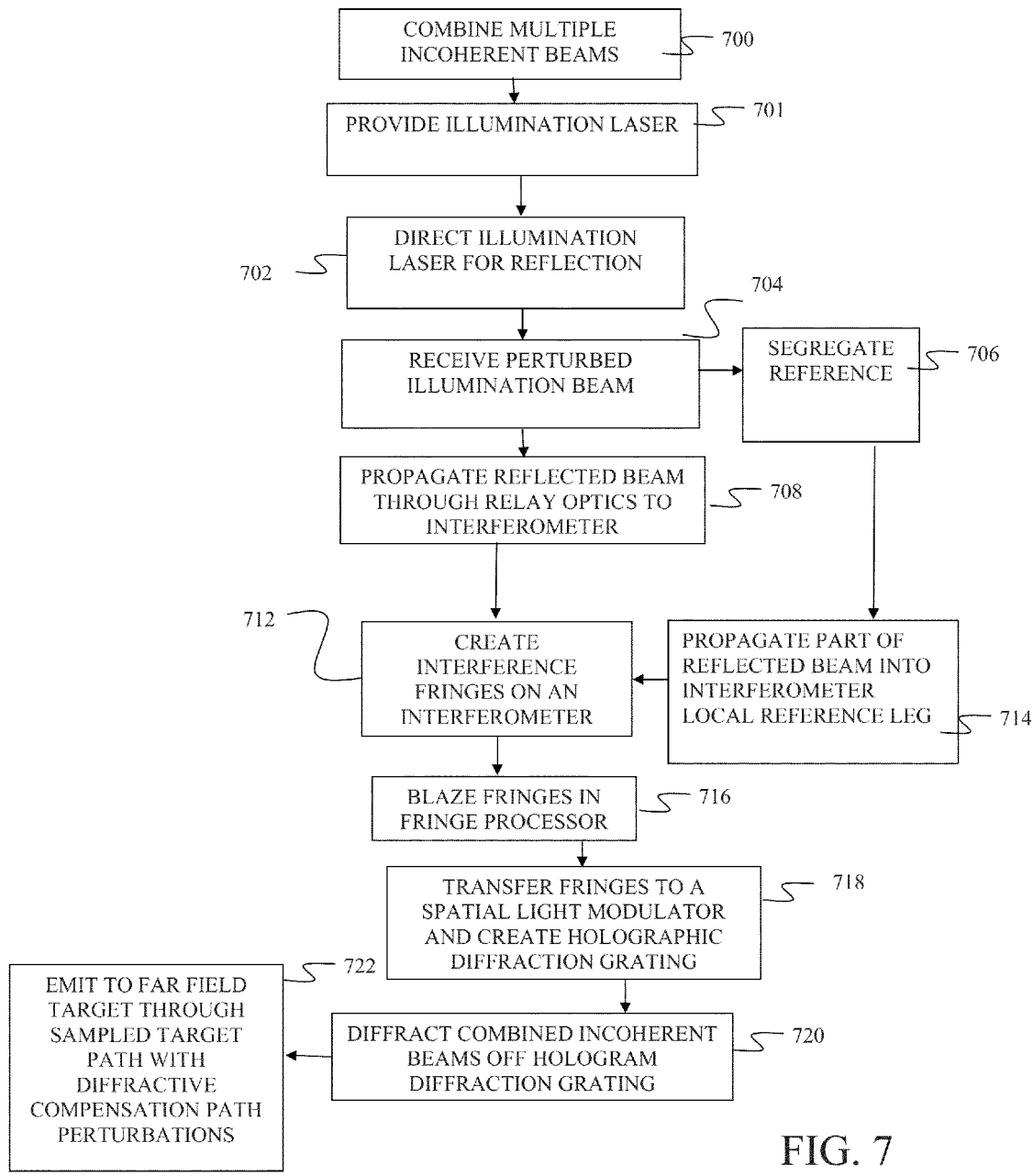

The exemplary embodiment is employed as shown in FIG. 7 combines multiple incoherent laser beams by angle using carrier frequency tilt fringes, step 700, provides an illumination laser, step 701, and directs the illumination beam through either a separate aperture or a common aperture with the system output for reflection from the target or for backscatter reflection, step 702. Receive the reflected illumination beam reflected as perturbed by the path, step 704, segregate a portion of the illumination beam as a local reference, step 706, and propagate the returned illumination beam through the relay optics to an interferometer, step 708. Create interference fringes from the perturbed reflected illumination beam in the interferometer, step 712, which may be locally referenced with the segregated portion of the illumination beam to form the interference fringes, step 714. The interference fringes are then blazed, step 716, and transferred to a spatial light modulator generating a real time hologram, step 718. The combined incoherent beams are then diffracted from the SLM hologram fringes, step 720, and emitted to the far field with diffractive compensation for the perturbations created by the target path for the aperture applied to each sub-aperture by the real time holographic grating, step 722.

Exemplary applications of beam correction as enabled by the embodiments disclosed include beam combination of moderate power lasers for high power application, telecommunication systems (Lasercom) and imaging systems.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for path compensation of multiple incoherent optical beams comprising:
    an aperture receiving a combined plurality of incoherent beams;
    an illumination laser providing an illumination beam for reflection;
    an interferometer receiving a sample of the reflected illumination beam and providing interference fringes;
    a spatial light modulator (SLM) receiving the interference fringes and generating a hologram; and
    relay optics for transmitting the combined plurality of incoherent beams to the SLM and receiving a diffraction corrected full aperture compensated combined beam for far field emission.

2. The system for path compensation of multiple incoherent optical beams as defined in claim 1 wherein the interferometer blazes the interference fringes.

3. The system for path compensation of multiple incoherent optical beams as defined in claim 2 wherein the plurality of incoherent beams are combined by angle using carrier frequency tilt fringes.

4. The system for path compensation of multiple incoherent optical beams as defined in claim 1 wherein the relay optics include a relay telescope for focusing the combined plurality of incoherent beams in the aperture to a pupil plane.

5. The system for path compensation of multiple incoherent optical beams as defined in claim 1 wherein the illumination laser is reflected from a target.

6. The system for path compensation of multiple incoherent optical beams as defined in claim 5 wherein the reflected illumination beam is received by the interferometer through the relay optics.

7. The system for path compensation of multiple incoherent optical beams as defined in claim 5 further comprising:
a beam splitter receiving a portion of the reflected illumination beam to transmit the portion to the interferometer as a local reference.

8. The system for path compensation of multiple incoherent optical beams as defined in claim 1 wherein the illumination laser employs backscatter return.

9. The system for path compensation of multiple incoherent optical beams as defined in claim 8 wherein the reflected illumination beam is received by the interferometer through the relay optics.

10. The system for path compensation of multiple incoherent optical beams as defined in claim 8 further comprising:
a beam splitter receiving a portion of the reflected illumination beam to transmit the portion to the interferometer as a local reference.

11. A high beam quality multiple incoherent beam laser source comprising:
an aperture receiving a plurality of incoherent beams combined by angle using carrier frequency tilt fringes;
an illumination laser providing an illumination beam for reflection;
a beam splitter receiving a portion of the reflected illumination beam as a local reference;
an interferometer receiving a sample of the reflected illumination beam from the beam splitter and providing blazed interference fringes;
a spatial light modulator (SLM) receiving the interference fringes and generating a hologram; and
relay optics for transmitting the combined plurality of incoherent beams to the SLM and receiving a diffraction corrected full aperture compensated combined beam for far field emission.

12. The system for path compensation of multiple incoherent optical beams as defined in claim 11 wherein the relay optics include a relay telescope for focusing the combined plurality of incoherent beams in the aperture to a pupil plane.

13. The system for path compensation of multiple incoherent optical beams as defined in claim 11 wherein the illumination laser is reflected from a target.

14. The system for path compensation of multiple incoherent optical beams as defined in claim 11 wherein reflection of the illumination laser employs backscatter return.

\* \* \* \* \*